(12) United States Patent
Ogura et al.

(10) Patent No.: US 10,061,119 B2
(45) Date of Patent: Aug. 28, 2018

(54) LIGHT SCANNING APPARATUS

(71) Applicant: CANON KABUSHIKI KAISHA, Tokyo (JP)

(72) Inventors: Masahiro Ogura, Saitama (JP); Yuichiro Imai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/718,510

(22) Filed: Sep. 28, 2017

(65) Prior Publication Data

US 2018/0101003 A1    Apr. 12, 2018

(30) Foreign Application Priority Data

Oct. 6, 2016 (JP) ................... 2016-198242

(51) Int. Cl.
  *G03G 15/00* (2006.01)
  *G02B 26/10* (2006.01)
  *G03G 15/04* (2006.01)

(52) U.S. Cl.
  CPC ..... *G02B 26/105* (2013.01); *G03G 15/04036* (2013.01)

(58) Field of Classification Search
  USPC ....... 399/3, 4, 118, 144, 177, 198, 202, 220, 399/221
  See application file for complete search history.

(56) References Cited

U.S. PATENT DOCUMENTS

| | | | |
|---|---|---|---|
| 7,072,087 B2 | 7/2006 | Nakahata | 359/204.1 |
| 7,298,390 B2 | 11/2007 | Nakahata | 347/231 |
| 7,522,326 B1 | 4/2009 | Otoguro | 347/256 |
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |
| 8,810,622 B2 | 8/2014 | Mamiya et al. | 347/242 |

(Continued)

FOREIGN PATENT DOCUMENTS

JP    2002-006250    1/2002

OTHER PUBLICATIONS

U.S. Appl. No. 15/702,219, filed Sep. 12, 2017.

(Continued)

*Primary Examiner* — Hoan Tran

(74) *Attorney, Agent, or Firm* — Fitzpatrick, Cella, Harper & Scinto

(57) ABSTRACT

A light scanning apparatus, including: a light source; a deflection unit configured to deflect a light beam emitted from the light source; a reflecting mirror configured to reflect the light beam to a photosensitive member; a housing; a first support portion provided in the housing to support one end of the reflecting mirror; a second support portion provided in the housing to support the other end of the reflecting mirror; a first leaf spring configured to press the reflecting mirror at the one end to apply an urging force for urging the reflecting mirror against the first support portion; and a second leaf spring configured to press the reflecting mirror at the other end to apply an urging force for urging the reflecting mirror against the second support portion, wherein a pressing force of the first leaf spring is larger than a pressing force of the second leaf spring.

8 Claims, 7 Drawing Sheets

(56) References Cited

U.S. PATENT DOCUMENTS

| | | | |
|---|---|---|---|
| 8,902,268 B2* | 12/2014 | Otoguro | G03G 13/04 347/134 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2009/0244670 A1 | 10/2009 | Sato et al. | 359/205.1 |
| 2012/0081770 A1 | 4/2012 | Sato et al. | 359/204.1 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,071, filed Feb. 7, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.

* cited by examiner

LIGHT SCANNING APPARATUS

BACKGROUND OF THE INVENTION

Field of the Invention

The present invention relates to a light scanning apparatus, which includes a reflecting mirror configured to reflect a light beam.

Description of the Related Art

Hitherto, there has been widely known an electrophotographic image forming apparatus. An image forming apparatus typically includes a light scanning apparatus configured to form an electrostatic latent image on a photosensitive drum with a light beam modulated based on image information. The light scanning apparatus generally includes a light source, a deflection unit, an optical unit, and a reflecting mirror. The light source is configured to emit a light beam based on image information. The deflection unit includes a rotary polygon mirror rotated by a drive motor. The optical unit is constructed by an imaging lens system such as fθ lenses. The reflecting mirror is configured to reflect the light beam to lead the light beam to the photosensitive drum. The light beam emitted from the light source is deflected by the rotary polygon mirror. The deflected light beam passes through the imaging lens system to reach the reflecting mirror. The light beam having reached the reflecting mirror is reflected by the reflecting mirror and is irradiated to the photosensitive drum. With this action, an electrostatic latent image is formed on a uniformly charged surface of the photosensitive drum. In order to fix the reflecting mirror in the light scanning apparatus, as disclosed in Japanese Patent Application Laid-Open No. 2002-6250, there has been proposed a method of bringing any one of a reflection surface and a back surface of the reflecting mirror into abutment against pedestals provided in a housing of the light scanning apparatus and pressing the reflecting mirror against the pedestals by elastic members such as leaf springs to hold the reflecting mirror with a friction force.

As a material for the housing of the light scanning apparatus, there is often used aluminum or engineering plastic in view of dimension accuracy, strength, and weight. As a material for the reflecting mirror, there is generally used glass in view of surface accuracy, durability, and cost. An internal temperature of the image forming apparatus to which the light scanning apparatus is mounted is changed within a range of from about 20° C. to about 40° C. due to heat from a fixing device or an electrical component. Therefore, the light scanning apparatus is affected by an environmental temperature change of about 20° C. Coefficients of linear expansion of aluminum and engineering plastic fall within a range of from $23 \times 10^{-6}$/K to $50 \times 10^{-6}$/K. A coefficient of linear expansion of glass is about $9 \times 10^{-6}$/K. Thus, a coefficient of linear expansion of the housing is about 2.5 times to about 5.5 times as large as the coefficient of linear expansion of the reflecting mirror, and hence the coefficient of linear expansion of the housing is larger than the coefficient of linear expansion of the reflecting mirror. When an image is formed on a sheet of A3 size, a length of a scanning line is about 300 mm. Therefore, a length of the reflecting mirror in a longitudinal direction also needs to be about 300 mm. When the housing made of aluminum and the reflecting mirror made of glass are used, and the environmental temperature changes by 20° C., a difference in thermal expansion amount between the housing and the reflecting mirror at the pedestals for holding the reflecting mirror is about 90 μm.

As disclosed in Japanese Patent Application Laid-Open No. 2002-6250, when the reflecting mirror is brought into abutment against the pedestals, and the reflecting mirror is pressed against the pedestal by the leaf springs so that the reflecting mirror is held by the friction force, the above-mentioned difference in thermal expansion amount causes slippage at a contact portion between the reflecting mirror and the housing. The slippage may occur at any one of both end portions of the reflecting mirror, and a support surface of the pedestal on the side on which the slippage has not occurred serves as a reference plane to position the reflecting mirror. Rotation of the reflecting mirror about a main scanning axis direction has a significant influence on displacement of an irradiation position at which the light beam is irradiated to the surface of the photosensitive drum. When the reference plane supporting the reflecting mirror is changed due to a change in position at which the slippage occurs, the reflecting mirror rotates about the main scanning axis direction, with the result that the irradiation position is displaced. Hitherto, the leaf springs for holding the both end portions of the reflecting mirror have substantially the same structure in view of standardization and ease of assembly of components. Therefore, which one of the both end portions of the reflecting mirror involves the slippage depends on the tolerance or mold accuracy of light scanning apparatus. Thus, the variation in irradiation position due to thermal deformation of the housing of the light scanning apparatus differ depending on the light scanning apparatus. Accordingly, the displacement of the irradiation position cannot be corrected, with the result that the image may be degraded.

As methods for reducing the variation in irradiation position, there may be considered a method of bringing one end portion of the reflecting mirror into abutment against a side wall of the housing to set a position at which the slippage occurs, and a method of holding a center of the reflecting mirror. With regard to the method of bringing the one end portion of the reflecting mirror into abutment against the side wall of the housing, there is a problem in that assembly of the reflecting mirror to the housing becomes more difficult. Further, with regard to the method of holding the center of the reflecting mirror, there is a problem in that the reflecting mirror becomes more liable to vibrate.

SUMMARY OF THE INVENTION

Therefore, the present invention provides a light scanning apparatus which reduces variation in position of a reflecting mirror due to thermal deformation of a housing of the light scanning apparatus.

According to one embodiment of the present invention, there is provided a light scanning apparatus, comprising:

a light source configured to emit a light beam;

a deflection unit configured to deflect the light beam emitted from the light source so that the light beam scans on a surface of a photosensitive member;

a reflecting mirror configured to reflect the light beam deflected by the deflection unit to lead the light beam to the photosensitive member;

a housing to which the light source is attached, the housing being configured to hold the deflection unit and the reflecting mirror in the housing;

a first support portion which is provided in the housing and is configured to support one end side of the reflecting mirror in a longitudinal direction of the reflecting mirror;

a second support portion which is provided in the housing and is configured to support the other end side of the reflecting mirror in the longitudinal direction;

a first leaf spring configured to press the reflecting mirror at the one end side of the reflecting mirror so as to apply an urging force for urging the reflecting mirror against the first support portion; and a second leaf spring configured to press the reflecting mirror at the other end side of the reflecting mirror so as to apply an urging force for urging the reflecting mirror against the second support portion, wherein a pressing force of the first leaf spring for pressing the reflecting mirror is larger than a pressing force of the second leaf spring for pressing the reflecting mirror.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Now, modes for carrying out the present invention are described.

(Image Forming Apparatus)

Figure 2:
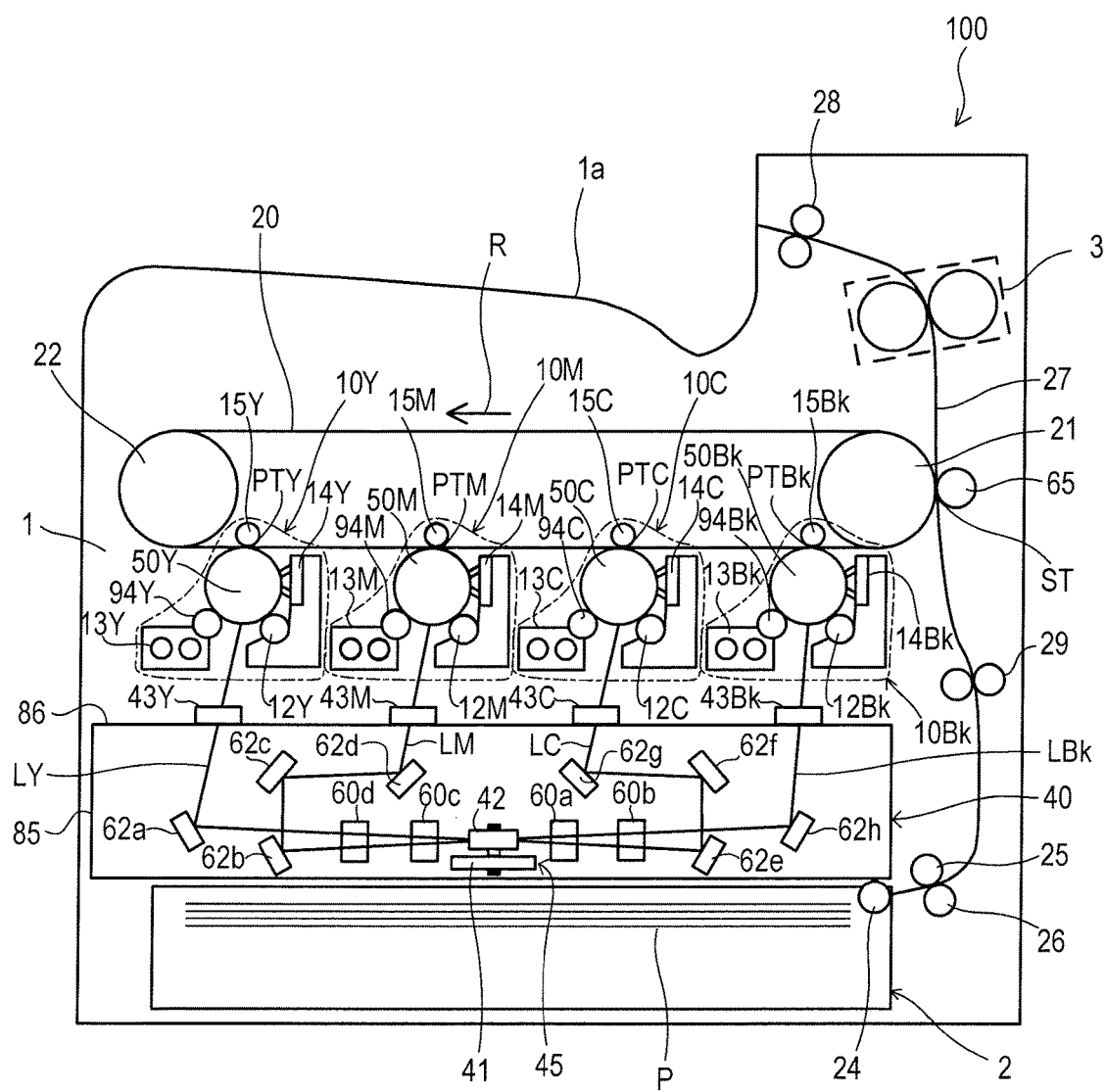
FIG. 2 is a sectional view of an image forming apparatus.

An electrophotographic image forming apparatus (hereinafter referred to as "image forming apparatus") 100 of an embodiment of the present invention is described. FIG. 2 is a sectional view of the image forming apparatus 100. The image forming apparatus 100 includes a laser beam printer, a digital copying machine, and a multi-function printer, which are configured to form an image on a recording medium through an electrophotographic process. In the embodiment, as an example of the image forming apparatus 100, a tandem-type color laser beam printer is illustrated. The image forming apparatus 100 is configured to form an image on a recording medium (hereinafter referred to as "sheet") P by an electrophotographic method. The image forming apparatus 100 includes four image forming portions 10 (10Y, 10M, 10C, 10Bk). The suffixes Y, M, C, and Bk of the reference symbols indicate yellow, magenta, cyan, and black, respectively. In the following description, the suffixes Y, M, C, and Bk may be omitted.

The image forming portions 10 each include a photosensitive drum serving as an image bearing member (hereinafter referred to as "photosensitive member") 50 (50Y, 50M, 50C, 50Bk). A process member configured to act on the photosensitive member 50 is arranged around each of the photosensitive members 50. Specifically, a charging roller (charging device) 12 (12Y, 12M, 12C, 12Bk), a developing device 13 (13Y, 13M, 13C, 13Bk), and a primary transfer roller (primary transfer member) 15 (15Y, 15M, 15C, 15Bk) are arranged around the photosensitive member 50. A light scanning apparatus (exposure apparatus) 40 is arranged below the four image forming portions 10.

The charging roller (charging member) 12 is applied with a charging bias, to thereby uniformly charge a surface of the photosensitive member 50. The developing device 13 includes a developing roller (developer carrying unit) 94 (94Y, 94M, 94C, 94Bk) configured to carry developer (toner) of each color. The developing roller 94 is applied with a developing bias, to thereby develop an electrostatic latent image formed on the surface of the photosensitive member 50 with the toner to obtain a toner image.

The image forming apparatus 100 includes an intermediate transfer belt (intermediate transfer member) 20 onto which toner images of a plurality of colors are primarily transferred from the respective image forming portions 10. The intermediate transfer belt 20 is arranged above the four image forming portions 10. The intermediate transfer belt 20 is an endless belt that is stretched around a pair of belt conveyance rollers 21 and 22. The intermediate transfer belt 20 is rotated in a direction indicated by the arrow R. The primary transfer roller 15 is arranged so as to face the photosensitive member 50 of the image forming portion 10 across the intermediate transfer belt 20. The primary transfer roller 15 forms a primary transfer portion PT (PTY, PTM, PTC, PTBk) between the intermediate transfer belt 20 and the photosensitive member 50. Through application of a transfer voltage to the primary transfer roller 15, the toner image on the photosensitive member 50 is primarily transferred onto the intermediate transfer belt 20.

The four image forming portions 10Y, 10M, 10C, and 10Bk are arranged in line below the intermediate transfer belt 20. Along a rotational direction R of the intermediate transfer belt 20, the yellow image forming portion 10Y, the magenta image forming portion 10M, the cyan image forming portion 10C, and the black image forming portion 10Bk are arranged in the stated order. The image forming portions 10 form a yellow toner image, a magenta toner image, a cyan toner image, and a black toner image with the toners of the respective colors. A secondary transfer roller 65 is arranged so as to face the belt conveyance roller 21 across the intermediate transfer belt 20, to thereby form a secondary transfer portion ST between the secondary transfer roller 65 and the intermediate transfer belt 20.

A sheet feeding cassette 2 configured to receive the sheets P is provided at a lower portion of a main body 1 of the image forming apparatus 100. The sheet feeding cassette 2 is removably mounted to the lower portion of the main body 1 from a side surface of the main body 1. A pickup roller 24 and a feed roller 25 are provided above the sheet feeding cassette 2. The pickup roller 24 and the feed roller 25 are configured to feed the sheets P received in the sheet feeding cassette 2 one by one. A retard roller 26 is arranged so as to face the feed roller 25 in order to prevent multifeeding of the sheets P. A conveyance route 27 of the sheet P in an interior of the main body 1 is formed so as to be substantially vertical along a right side surface of the main body 1 illustrated in FIG. 2. A registration roller pair 29, the secondary transfer portion ST, a fixing device 3, and a delivery roller pair 28 are provided in the conveyance route 27.

(Image Forming Process)

Now, an image forming process in the image forming apparatus 100 is described. The charging roller 12 uniformly charges a surface of the photosensitive member 50. The light scanning apparatus 40 exposes the uniformly charged surface of the photosensitive member 50 to laser light (hereinafter referred to as "light beam") L (LY, LM, LC, LBk), which is modulated based on image information (image data) of each color. With this action, an electrostatic latent image is formed on the surface of the photosensitive member 50. The developing device 13 develops the electrostatic latent image with the toner of each color, to thereby form the toner image of each color on the photosensitive member 50. The toner images of the four colors formed by the four image forming portions 10 are primarily transferred by the primary transfer rollers 15 onto the intermediate transfer belt 20 rotated in the rotational direction R, and are then superimposed on the intermediate transfer belt 20. The toner (transfer residual toner) remaining on the photosensitive member 50 after the primary transfer is collected by a cleaning device 14 (14Y, 14M, 14C, 14Bk).

Meanwhile, the sheet P is fed to the registration roller pair 29 from the sheet feeding cassette 2 by the pickup roller 24 and the feed roller 25. The registration roller pair 29 conveys the sheet P to the secondary transfer portion ST between the secondary transfer roller 65 and the intermediate transfer belt 20 in synchronization with the toner images superimposed on the intermediate transfer belt 20. The toner images superimposed on the intermediate transfer belt 20 are secondarily transferred onto the sheet P collectively in the secondary transfer portion ST. The toner remaining on the intermediate transfer belt 20 without being transferred onto the sheet P during the secondary transfer is collected by a cleaning mechanism (not shown) of the intermediate transfer belt 20. The sheet P having the toner image transferred thereon is conveyed to the fixing device 3 arranged upstream of the secondary transfer portion ST along the conveyance route 27. The fixing device 3 heats and pressurizes the sheet P, to thereby fix the toner images onto the sheet P. In this manner, a full-color image is formed on the sheet P. The sheet P having the image formed thereon is delivered onto a delivery tray 1a provided at an upper portion of the main body 1 by the delivery roller pair 28.

(Light Scanning Apparatus)

As described above, in a case of forming the full-color image by the image forming apparatus 100, the light scanning apparatus 40 is configured to expose the photosensitive members 50Y, 50M, 50C, and 50Bk of the respective image forming portions 10 to the light beams at respective predetermined timings based on the image information pieces of the respective colors. With this action, the toner images of the respective colors are formed on the photosensitive members 50 based on the image information pieces of the respective colors. In order to obtain the full-color image with high quality, positions of the electrostatic latent images formed by the light scanning apparatus 40 need to be reproducibly aligned with high accuracy. In the embodiment, the light scanning apparatus 40 is shared by the four image forming portions 10Y, 10M, 10C, and 10Bk.

Figure 3:
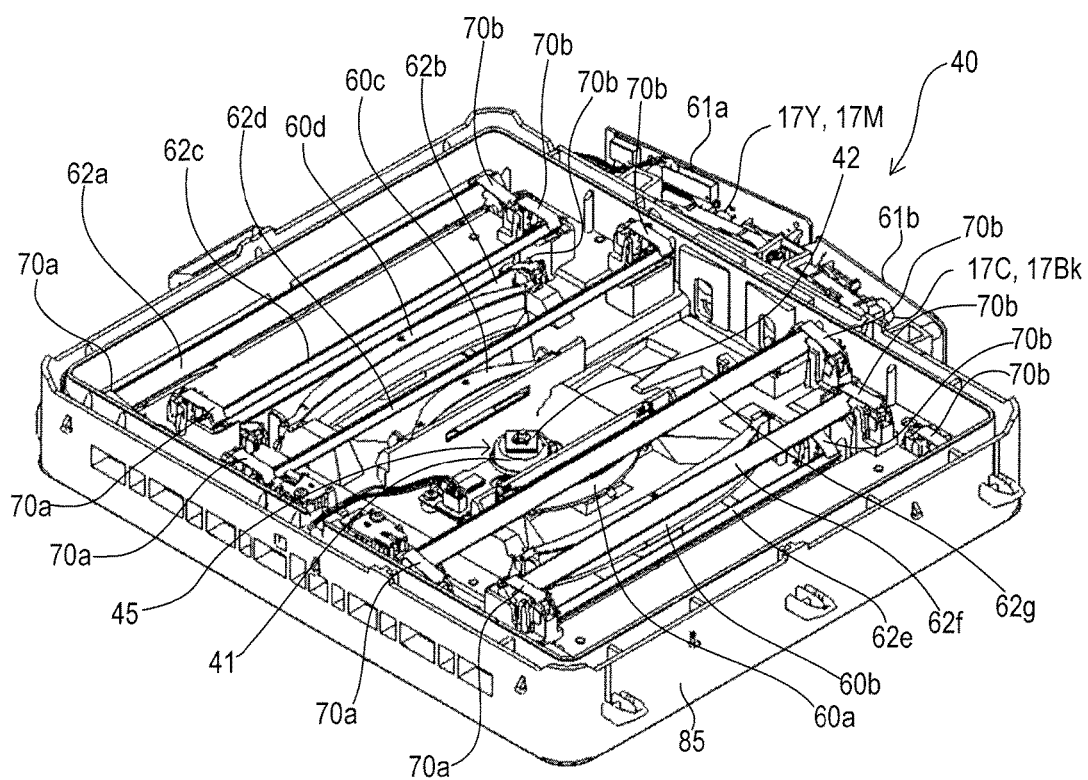
FIG. 3 is a perspective view of a light scanning apparatus.

FIG. 3 is a perspective view of the light scanning apparatus 40. The light scanning apparatus 40 includes an optical box (hereinafter referred to as "housing") 85 and a cover member 86 configured to tightly close an opening portion of the housing 85. In FIG. 3, for illustration of an inside of the housing 85, the cover member 86 is removed from the housing 85. In the housing 85, there are provided light source units 61 (61a, 61b), a rotary polygon mirror 42, and an optical unit. The optical unit includes optical members such as fθ lenses 60 (60a, 60b, 60c, 60d) and reflecting mirrors 62 (62a, 62b, 62c, 62d, 62e, 62f, 62g, 62h) serving as an imaging lens system. The light scanning apparatus 40 includes four semiconductor lasers (hereinafter referred to as "light sources") 17 (17Y, 17M, 17C, 17Bk) each configured to emit a light beam modulated based on image information on each color. The light source unit 61a holds the light source 17Y configured to emit a light beam LY modulated based on the image information on yellow and the light source 17M configured to emit a light beam LM modulated based on the image information on magenta. The light source unit 61b holds the light source 17C configured to emit a light beam LC modulated based on the image information on cyan and the light source 17Bk configured to emit a light beam LBk modulated based on the image information on black.

The light scanning apparatus 40 includes a deflection unit 45 configured to deflect a light beam L in a central part of the housing 85. The deflection unit 45 is configured to deflect the light beam so that the light beam L emitted from the light source 17 scans on a surface of the photosensitive member 50. The deflection unit 45 includes a rotary polygon mirror 42, a drive motor 41 configured to rotate the rotary polygon mirror 42, and a circuit board 43 configured to drive the drive motor 41. The light beam L emitted from the light source 17 is emitted toward the rotary polygon mirror 42. The light beam L is deflected by the rotary polygon mirror 42 being rotated. The light beam L deflected by the rotary polygon mirror 42 is guided by the optical unit provided in the light scanning apparatus 40, thereby forming images being light spots on the surface of the photosensitive member 50. The light spots of the light beam L scan on the surface (scanned surface) of the photosensitive member 50 along a main scanning direction, that is, along a rotation axis direction of the photosensitive member 50.

One reflecting mirror 62 or a plurality of reflection mirrors 62 reflect the light beam deflected by the deflection unit 45 to lead the light beam to the photosensitive member 50. Now, an optical path of each of the light beams LBk, LC, LM, and LY is described. The light beam LY emitted from the light source 17Y corresponding to the photosensitive member 50Y is deflected by the rotary polygon mirror 42, and enters a first fθ lens 60c having a strong power in the main scanning direction. The light beam LY having passed through the first fθ lens 60c enters a second fθ lens 60d having a strong power in the sub-scanning direction, passes through the second fθ lens 60d, and is then reflected by the reflecting mirror 62a. The light beam LY reflected by the reflecting mirror 62a passes through a transparent window 43Y provided to the cover member 86, to thereby scan on the photosensitive member 50Y.

The light beam LM emitted from the light source 17M corresponding to the photosensitive member 50M is deflected by the rotary polygon mirror 42, and enters the first fθ lens 60c having a strong power in the main scanning direction. The light beam LM having passed through the first fθ lens 60c enters the second fθ lens 60d having a strong power in the sub-scanning direction, passes through the second fθ lens 60d, and is then reflected by the reflecting mirror 62b, the reflecting mirror 62c, and the reflecting mirror 62d. The light beam LM reflected by the reflecting mirror 62d passes through a transparent window 43M provided to the cover member 86, thereby scanning the photosensitive member 50M.

The light beam LC emitted from the light source 17C corresponding to the photosensitive member 50C is deflected by the rotary polygon mirror 42, and enters the first fθ lens 60a having a strong power in the main scanning direction. The light beam LC having passed through the first fθ lens 60a enters the second fθ lens 60b having a strong power in the sub-scanning direction, passes through the second fθ lens 60b, and is then reflected by the reflecting mirror 62e, the reflecting mirror 62f, and the reflecting mirror 62g. The light beam LC reflected by the reflecting mirror 62g passes through a transparent window 43C provided to the cover member 86, thereby scanning the photosensitive member 50M.

The light beam LBk emitted from the light source 17Bk corresponding to the photosensitive member 50Bk is deflected by the rotary polygon mirror 42, and enters the first fθ lens 60a having a strong power in the main scanning direction. The light beam LBk having passed through the first fθ lens 60a enters the second fθ lens 60b having a strong power in the sub-scanning direction, passes through the second fθ lens 60b, and is then reflected by the reflecting mirror 62h. The light beam LBk reflected by the reflecting mirror 62h passes through a transparent window 43Bk provided to the cover member 86, thereby scanning the photosensitive member 50Bk.

(Reflecting Mirror Holding Portions)

Figure 4A:
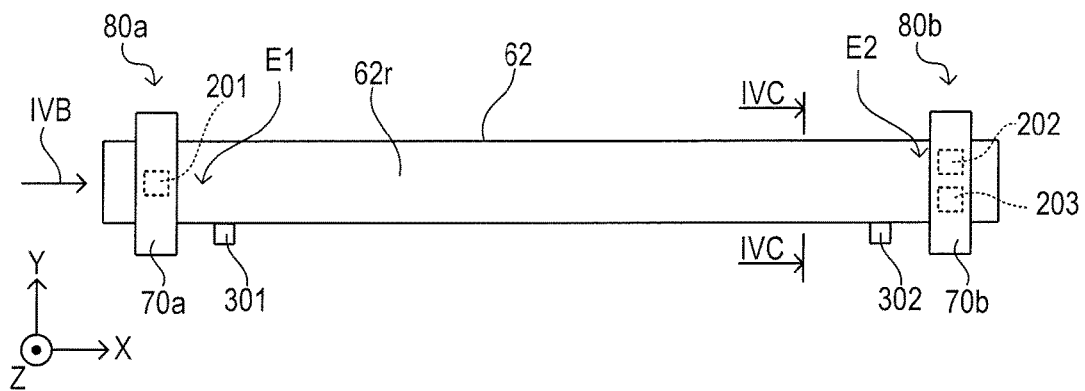
FIG. 4A, FIG. 4B, and FIG. 4C are views for illustrating holding portions for the reflecting mirror.
Figure 4B:
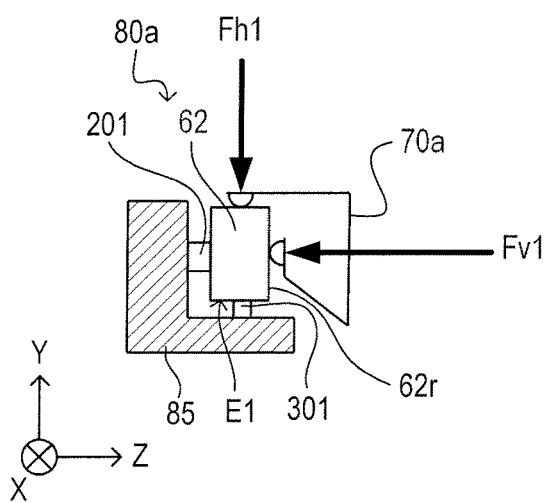
Figure 4C:
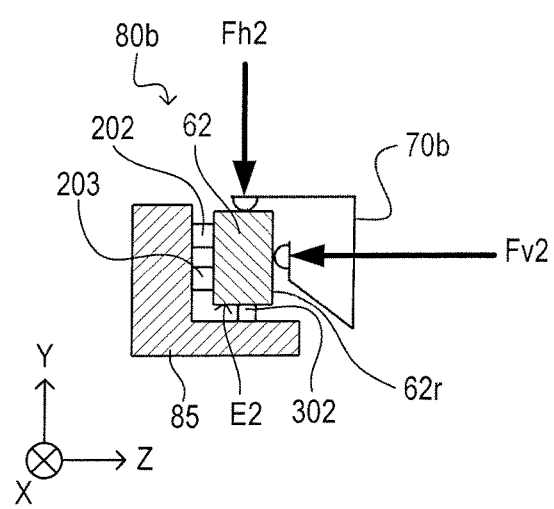

The reflecting mirror 62 has an elongated shape extending in the main scanning direction. Now, description is made of holding portions 80 (80a, 80b) configured to hold the reflecting mirror 62 being an elongated optical element. FIG. 4A, FIG. 4B, and FIG. 4C are views for illustrating the holding portions 80 for the reflecting mirror 62. FIG. 4A is a plan view for illustrating the holding portions 80 as viewed from a reflection surface 62r side of the reflecting mirror 62. FIG. 4B is a side view for illustrating the holding portion 80a provided at one end portion E1 of the reflecting mirror 62 as viewed from the direction indicated by the arrow IVB of FIG. 4A. FIG. 4C is a sectional view for illustrating the reflecting mirror 62 taken along the line IVC-IVC of FIG. 4A, and is a side view for illustrating the holding portion 80b provided at the other end portion E2 of the reflecting mirror 62. Herein, a coordinate system is defined with X representing a longitudinal direction (main scanning direction) of the reflecting mirror 62, Z representing a direction perpendicular to the reflection surface 62r, and Y representing a transverse direction (sub-scanning direction) of the reflecting mirror 62.

The reflecting mirror 62 is held at the both end portions E1 and E2 thereof by the leaf springs 70 (70a, 70b) being the pressing units under a state of being pressed by pedestals (protrusions) 201, 202, 203, 301, and 302 serving as support portions provided to the housing 85. The reflecting mirror 62 is supported in the direction Z perpendicular to the reflection surface 62r at three points including the pedestals (perpendicular support portions) 201, 202, and 203. The reflecting mirror 62 is supported in the direction Y parallel to the reflection surface 62r at two points including the pedestals (parallel support portions) 301 and 302. In the embodiment, the three pedestals 201, 202, and 203 are provided as the perpendicular support portions. However, the number of the perpendicular support portions is not limited to three. It is only necessary that at least two pedestals be provided as the perpendicular support portions. Further, in the embodiment, the two pedestals 301 and 302 are provided as the parallel support portions. However, the number of the parallel support portions is not limited to two. It is only necessary that at least one pedestal be provided as the parallel support portion. One end portion (first end portion) E1 of the reflecting mirror 62 in the longitudinal direction is held by the holding portion (first holding portion) 80a provided to the housing 85. The holding portion 80a includes the pedestals (first support portions) 201 and 301 provided to the housing 85 and the first leaf spring (first pressing unit) 70a being an elastic member. The leaf spring 70a applies an urging force for urging the reflecting mirror 62 against the pedestals 201 and 301. As illustrated in FIG. 4B, the one end portion (one end side) E1 of the reflecting mirror 62 is pressed by the leaf spring 70a against the pedestal (first parallel support portion) 301 with a force Fh1 and against the pedestal (first perpendicular support portion) 201 with a force Fv1. The force Fh1 is part of a pressing force F1 which acts on the one end portion E1 of the reflecting mirror 62 by the leaf spring 70a and is a component in a direction parallel to the reflection surface 62r (perpendicular load in a parallel direction). The force Fv1 is part of the pressing force F1 of the leaf spring 70a and is a component in a direction perpendicular to the reflection surface 62r (perpendicular load in a perpendicular direction).

The other end portion (second end portion) E2 of the reflecting mirror 62 in the longitudinal direction is held by the holding portion (second holding portion) 80b provided to the housing 85. The holding portion 80b includes the pedestals (second support portions) 202, 203, and 302 provided to the housing 85, and the second leaf spring (second pressing unit) 70b being an elastic member. The leaf spring 70b applies an urging force for urging the reflecting mirror 62 against the pedestals 202, 203, and 302. As illustrated in FIG. 4C, the other end portion (the other end side) E2 of the reflecting mirror 62 is pressed by the leaf spring 70b against the pedestals (second perpendicular support portions) 202 and 203 with a force Fv2 and against the pedestal (second parallel support portion) 302 with a force Fh2. The force Fh2 is part of a pressing force F2 which acts on the other end portion E2 of the reflecting mirror 62 by the leaf spring 70b and is a component in a direction parallel to the reflection surface 62r (perpendicular load in a parallel direction). The force Fv2 is part of the pressing force F2 of the leaf spring 70b and is a component in a direction perpendicular to the reflection surface 62r (perpendicular load in a perpendicular direction). In the embodiment, each of the leaf springs 70a and 70b configured to press the reflecting mirror 62 against the support portions (201, 202, 203, 301, 302) in the perpendicular direction Z and the parallel direction Y is constructed by a single component that is integrally formed. However, each of the leaf springs 70a and 70b may be constructed by two components including a component for pressing the reflecting mirror 62 in the perpendicular direction Z and a component for pressing the reflecting mirror 62 in the parallel direction Y.

When the housing 85 is made of aluminum or engineering plastic, and the reflecting mirror 62 is made of glass, the coefficient of linear expansion of the housing 85 is larger than the coefficient of linear expansion of the reflecting mirror 62 and is about 2.5 times to about 5.5 times as large as the coefficient of linear expansion of the reflecting mirror 62. When the environmental temperature rises, the housing 85 is expanded relative to the reflecting mirror 62. A difference between the amount of expansion of the housing 85 and the amount of expansion of the reflecting mirror 62 due to thermal expansion (thermal expansion difference) generates a stress in both of the housing 85 and the reflecting mirror 62. The stress generated in the both end portions E1 and E2 of the reflecting mirror 62 increases equivalently during the course of thermal expansion. Therefore, the slippage of the reflecting mirror 62 with respect to the pedestals 201, 202, 203, 301, and 302 of the housing 85 occurs at any one of the both end portions E1 and E2, which has a smaller maximum static friction force. The maximum static friction force is determined through multiplication of a coefficient of friction between the reflecting mirror 62 and each of the pedestals 201, 202, 203, 301, and 302 of the housing 85 by the perpendicular loads given by the leaf springs 70. A sum of the perpendicular loads Fv1 and Fh1 given by the pressing force of the leaf spring 70a at the one end portion E1 of the reflecting mirror 62 is F1 (=Fv1+Fh1). A sum of the perpendicular loads Fv2 and Fh2 given by the pressing force of the leaf spring 70b at the other end portion E2 of the reflecting mirror 62 is F2 (=Fv2+Fh2). The friction coefficients of the reflecting mirror 62 with respect to the pedestals 201, 202, 203, 301, and 302 of the housing 85 are equal at both end portions E1 and E2 of the reflecting mirror 62. Therefore, the slippage occurs at one end portion having a smaller F1 (=Fv1+Fh1) or a smaller F2 (=Fv2+Fh2). When the slippage occurs at any one of the end portions, a support surface of the pedestal at the end portion without occurrence of the slippage serves as a reference plane to position the reflection surface 62r of the reflecting mirror 62.

Figure 5A:
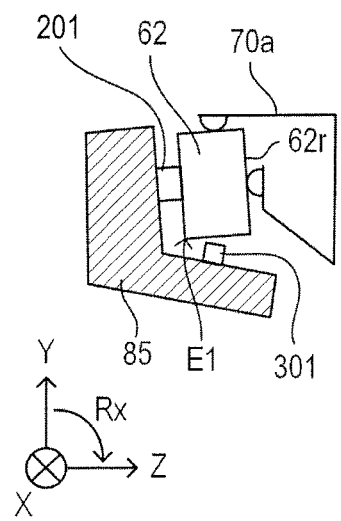
FIG. 5A, FIG. 5B, FIG. 5C, FIG. 5D, and FIG. 5E are views for illustrating changes in positions of the reflecting mirror in accordance with changes in pedestals serving as reference planes.
Figure 5B:
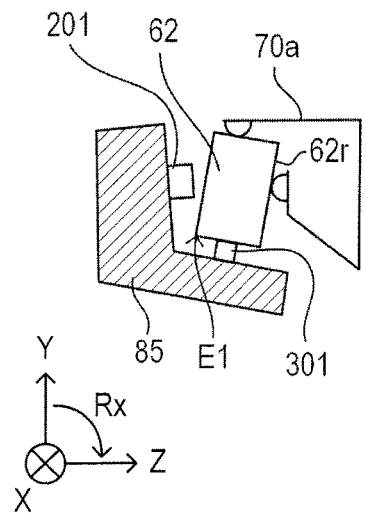
Figure 5C:
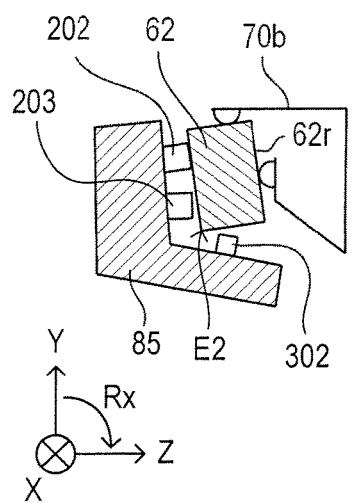
Figure 5D:
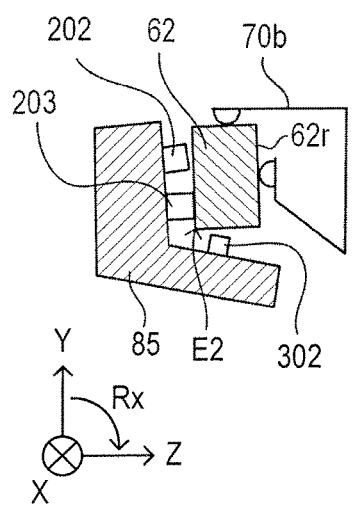
Figure 5E:
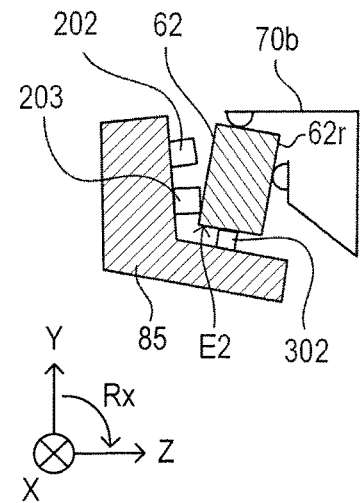

A position of the reflection surface 62r of the reflecting mirror 62 changes depending on which one of the support surfaces of the pedestals 201, 202, 203, 301, and 302 of the housing 85 serves as the reference plane. Now, description is made of changes in position of the reflection surface 62r caused by different reference planes at the time of occurrence of the slippage. FIG. 5A, FIG. 5B, FIG. 5C, FIG. 5D, and FIG. 5E are views for illustrating changes in positions of the reflecting mirror 62 in accordance with differences in pedestals 201, 202, 203, 301, and 302 serving as reference planes. In FIG. 5A, FIG. 5B, FIG. 5C, FIG. 5D, and FIG. 5E, the thermal deformation of the housing 85 is illustrated in an exaggerated manner for ease of description. The reflecting mirror 62 is positioned with the pedestal 201, 202, 203, 301, or 302 serving as a reference plane at one of the end portions E1 and E2 without occurrence of the slippage due to the thermal deformation. FIG. 5A is an illustration of an inclination of the reflecting mirror 62 in a case in which the reflecting mirror 62 is positioned with the pedestal 201 serving as the reference plane. FIG. 5B is an illustration of an inclination of the reflecting mirror 62 in a case in which the reflecting mirror 62 is positioned with the pedestal 301 serving as the reference plane. FIG. 5C is an illustration of an inclination of the reflecting mirror 62 in a case in which the reflecting mirror 62 is positioned with the pedestal 202 serving as the reference plane. FIG. 5D is an illustration of an inclination of the reflecting mirror 62 in a case in which the reflecting mirror 62 is positioned with the pedestal 203 serving as the reference plane. FIG. 5E is an illustration of an inclination of the reflecting mirror 62 in a case in which the reflecting mirror 62 is positioned with the pedestal 302 serving as the reference plane. An inclination Rx of the reflection surface 62r of the reflecting mirror 62 about the X axis has a significant influence on the positional displacement (hereinafter referred to as "irradiation position variation") of the spots of the light beam L on the surface of the photosensitive member 50. Therefore, the irradiation position variation occurs depending on which one of the pedestals 201, 202, 203, 301, and 302 serves as the reference plane.

Hitherto, in view of standardization and ease of assembly of components, the holding portions 80a and 80b for the both end portions E1 and E2 of the reflecting mirror 62 have substantially the same structure. The leaf springs 70a and 70b are also standardized, and the leaf springs 70a and 70b having an equal spring force are provided at the both end portions E1 and E2 of the reflecting mirror 62. Thus, the sum F1 (=Fh1+Fv1) of the perpendicular loads Fv1 and Fh1 given by the pressing force of the leaf spring 70a is substantially equal to the sum F2 (=Fv2+Fh2) of the perpendicular loads Fv2 and Fh2 given by the pressing force of the leaf spring 70b within the range of the tolerance. Therefore, occurrence of the slippage at which one of the one end portion E1 and the other end portion E2 of the reflecting mirror 62 cannot be estimated in advance. That is, the position of slippage differs for each product, and hence the irradiation position variation amount may vary for each product. The variation in irradiation position variation amount itself may cause degradation of a product performance. Therefore, a design with smaller variation is required.

Figure 1A:
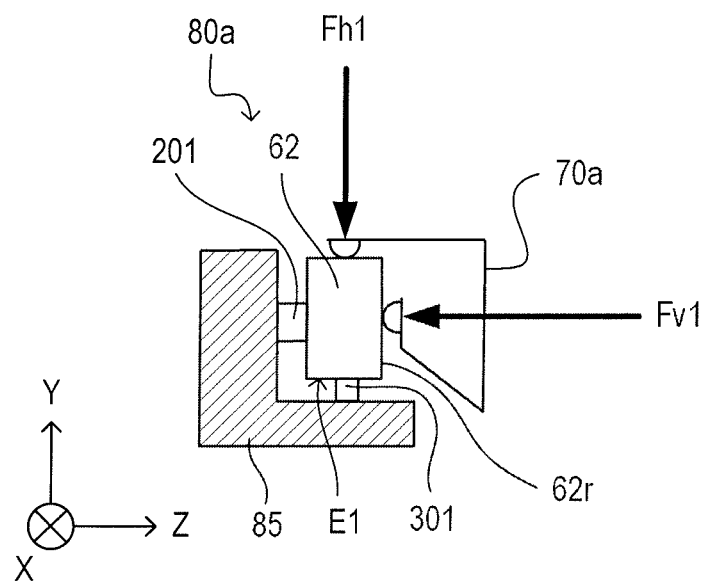
FIG. 1A and FIG. 1B are explanatory views for illustrating a difference in pressing forces which act on both end portions of a reflecting mirror.
Figure 1B:
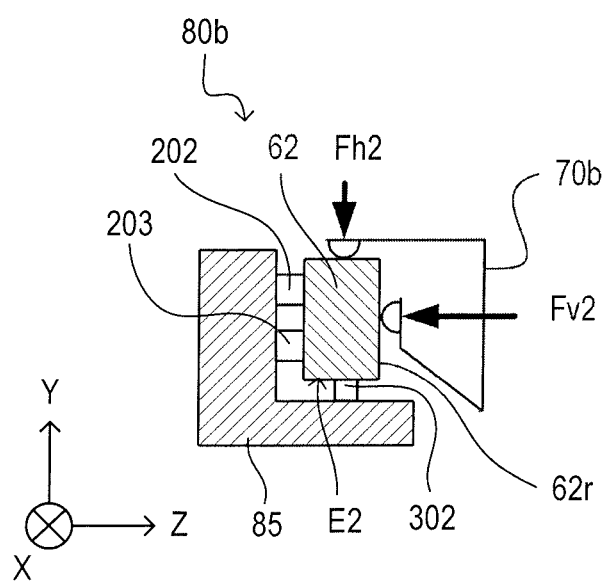

Therefore, in the embodiment, the pressing force of the first leaf spring 70a for pressing the reflecting mirror 62 is set so as to be larger than the pressing force of the second leaf spring 70b for pressing reflecting mirror 62. Specifically, the sum F1 (resultant force) of the perpendicular loads Fv1 and Fh1 given by the pressing force of the leaf spring 70a at the one end portion E1 is set so as to be larger than the sum F2 (resultant force) of the perpendicular loads Fv2 and Fh2 given by the pressing force of the leaf spring 70b at the other end portion E2. With this setting, the slippage due to the thermal deformation occurs at the other end portion E2, thereby being capable of setting the reference plane at the one end portion E1. Therefore, the variation in irradiation position variation amount for each product can be reduced. FIG. 1A and FIG. 1B are explanatory views for illustrating a difference between the pressing forces F1 and F2 which act on the both end portions E1 and E2 of the reflecting mirror 62. The pressing forces F1 and F2 which act on the both end portions E1 and E2 of the reflecting mirror 62 are set as follows.

$$F1 > F2$$

$$F1 = Fv1 + Fh1$$

$$F2 = Fv2 + Fh2$$

The pressing force (first pressing force) F1 which acts on the one end portion E1 of the reflecting mirror 62 is larger than the pressing force (second pressing force) F2 which acts on the other end portion E2. It is defined that, when the relationship of F1>F2 is satisfied, the slippage occurs between the reflecting mirror 62 and the pedestal 202, 203, or 302 at the other end portion E2 at the time of thermal deformation. A difference ΔF between the pressing forces F1 and F2 is larger than the tolerance of the pressing force of the leaf spring 70 having hitherto been used. Further, the perpendicular loads (perpendicular pressing forces) Fv1 and Fv2, which are perpendicular to the reflection surfaces 62r, of the pressing forces F1 and F2 are larger than the perpendicular loads (parallel pressing forces) Fh1 and Fh2, which are parallel to the reflection surface 62r. That is, when the relationships of Fv1>Fh1 and Fv2>Fh2 are satisfied, the reflecting mirror 62 is pressed with a larger force in the direction perpendicular to the reflection surface 62r, thereby suppressing the rotation of the reflecting mirror 62 about the X axis. With this action, the occurrence of the inclination Rx of the reflection surface 62r is suppressed. In the embodiment, the pedestal 201 is set so as to serve as the reference plane when the slippage occurs during the course of thermal expansion. Therefore, the reflecting mirror 62 is positioned in the state of FIG. 5A after the thermal expansion.

In contrast, when the relationship of F1<F2 is satisfied, it is not determined which one of the pedestal 202 and the pedestal 203 at the other end portion E2 serves as the reference plane at the time of occurrence of the slippage at the one end portion E1. Consequently, as illustrated in FIG. 5C and FIG. 5D, variation in position of the reflecting mirror 62 may occur. Therefore, in the embodiment, the pressing force F1 which acts on the one end portion E1 being on a one-point support side having one pedestal 201 extending in the direction perpendicular to the reflection surface 62r is set larger than the pressing force F2 which acts on the other end portion E2 being on a two-point support side having two pedestals 202 and 203 extending in the direction perpendicular to the reflection surface 62r. With this configuration, when the slippage occurs at the other end portion E2, the reflecting mirror 62 is positioned by the one pedestal 201, thereby being capable of reducing the variation of the inclination Rx of the reflection surface 62r.

Figure 6A:
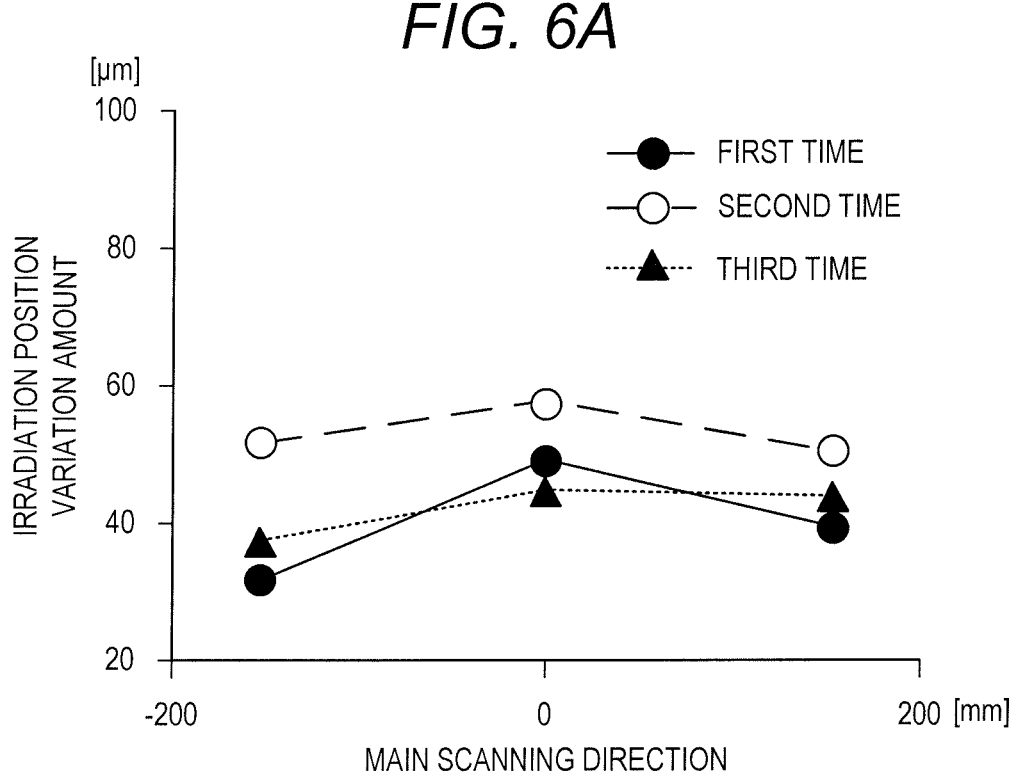
FIG. 6A and FIG. 6B are graphs for showing experiment results of a comparative example and an embodiment of the present invention.
Figure 6B:
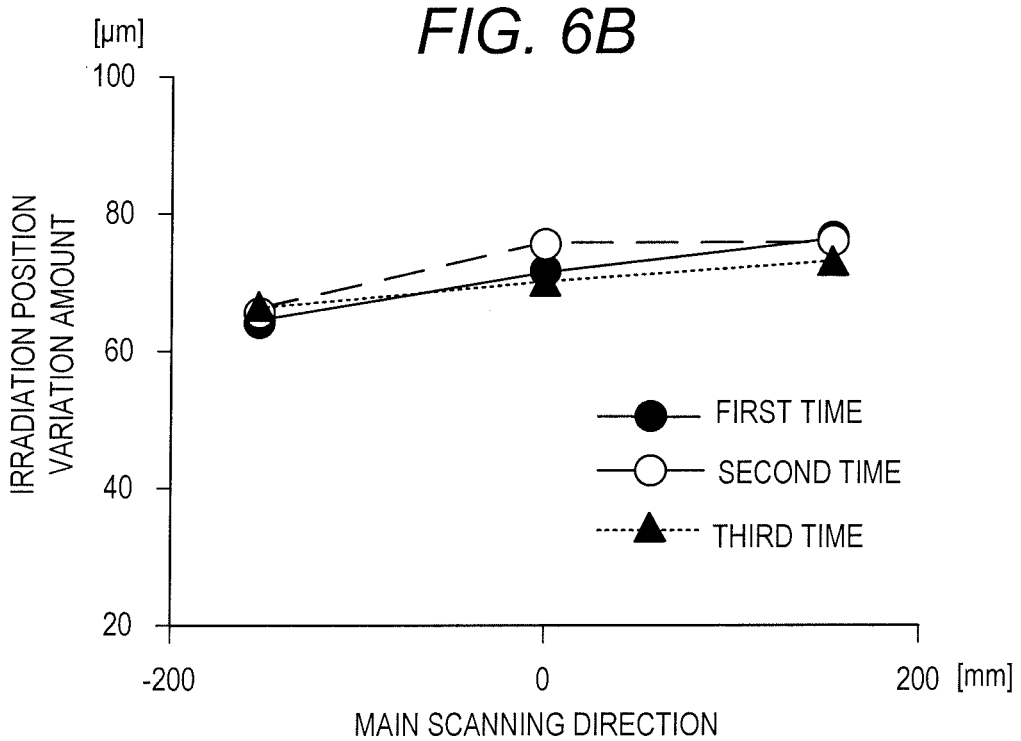

FIG. 6A and FIG. 6B are graphs for showing experiment results of a comparative example and the embodiment. FIG. 6A is a graph for showing the experiment result of the comparative example. In the comparative example, the perpendicular loads Fv1 and Fv2 were each set to 700 gf, and the perpendicular loads Fh1 and Fh2 were each set to 450 gf. The difference ΔF between the pressing forces F1 and F2 was 0 gf. With the leaf springs 70a and 70b having an equal pressing force, the both end portions E1 and E2 of the reflecting mirror 62 were mounted to the housing 85 for three times, and evaluation was performed. FIG. 6B is a graph for showing the experiment result of one example of the embodiment. In the embodiment, the perpendicular load Fv1 was set to 700 gf, and the perpendicular load Fv2 was set to 300 gf. Further, the perpendicular load Fh1 was set to 450 gf, and the perpendicular load Fh2 was set to 150 gf. The difference ΔF between the pressing forces F1 and F2 was 700 gf. With the leaf springs 70a and 70b having different pressing forces, the both end portions E1 and E2 of the reflecting mirror 62 were mounted to the housing 85, which was the same as that of the comparative example, for three times, and evaluation was performed. FIG. 6A and FIG. 6B are graphs for showing irradiation position variations given at the time when the temperature of the light scanning apparatus 40 rose after driving the light scanning apparatus for a predetermined time period. In the case of the embodiment having a difference of 700 gf in pressing forces of the both end portions E1 and E2, as shown in FIG. 6B, it can be seen that the variation in the irradiation position variation amount for each mounting is small. In contrast, in the case of the comparative example in which the both end portions E1 and E2 of the reflecting mirror 62 are held with a substantially equal pressing force, as shown in FIG. 6A, the variation in the irradiation position variation amount for each mounting is large. It can be seen that, in the case of the comparative example, there is more variation of equal to or more than 20 micrometers in irradiation position variation amount as compared to the embodiment. As the reasons of such variation in the irradiation position variation amount, the following is conceivable. When the leaf springs 70a and 70b having an equal pressing force are used, there may occur a difference in elastic deformation amount of the leaf springs 70a and 70b at the time of mounting of the leaf springs 70a and 70b. Therefore, slight difference in pressing force has occurred at each mounting, with the result that the positions of slippage differ. In contrast, as in the embodiment, when a difference of equal to or larger than a predetermined load is given in advance to the pressing forces which act on the both end portions E1 and E2 of the reflecting mirror 62, and the reference plane (reference position) in the case of occurrence of the slippage due to the thermal deformation is set, the variation in the irradiation position variation amount can be reduced for each product. Therefore, the degradation of an image to be formed on a recording medium in the image forming apparatus 100 can be suppressed.

Figure 7A:
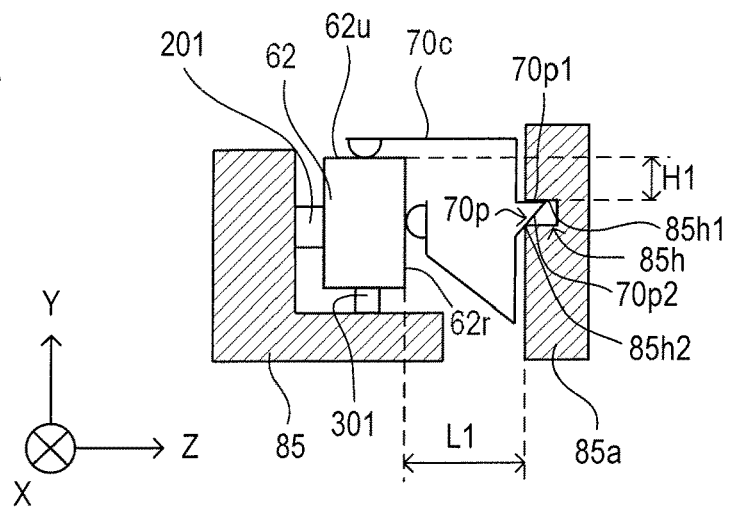
FIG. 7A, FIG. 7B, and FIG. 7C are views for illustrating examples of a mounting portion for providing a difference in pressing force to leaf springs having the same structure.
Figure 7B:
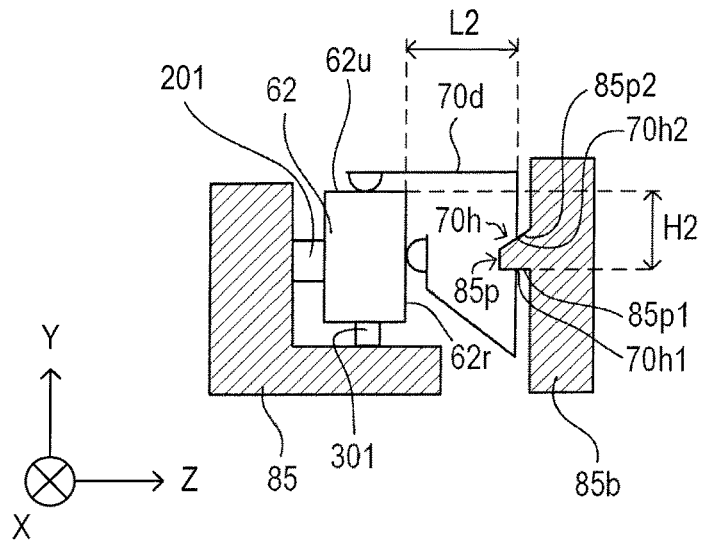
Figure 7C:
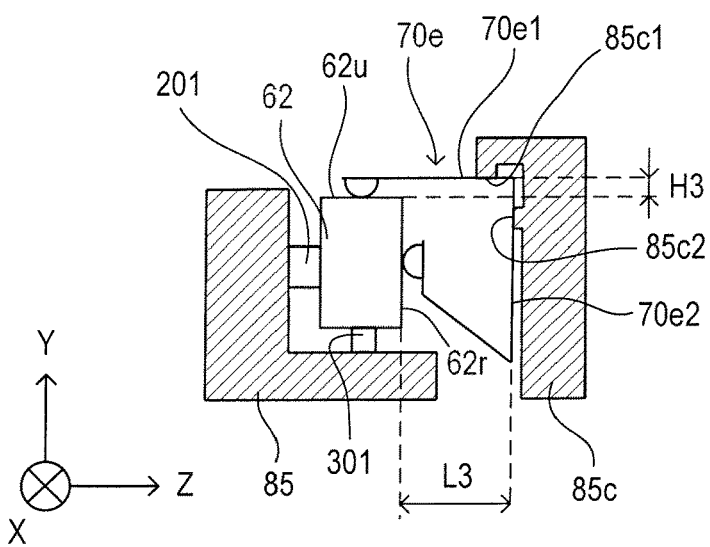

The difference ΔF between the pressing forces F1 and F2 which act on the both end portions E1 and E2 of the reflecting mirror 62 can be given by changing a material, a plate thickness, and/or a shape of the leaf springs 70a and 70b being the elastic members. However, even in the case in which the leaf springs having the same structure are used for the both end portions E1 and E2 of the reflecting mirror 62, the difference may be given to the pressing forces of the leaf springs at the both end portions by modifying the mounting portions of the housing 85. Now, description is made of different ways of pressing by the pressing forces with reference to FIG. 7A, FIG. 7B, and FIG. 7C. FIG. 7A, FIG. 7B, and FIG. 7C are views for illustrating examples of a mounting portion for providing a difference in pressing forces to leaf springs having the same structure. FIG. 7A is a view for illustrating a mounting portion 85a for providing a difference in pressing force to leaf springs 70c having the same structure. FIG. 7B is a view for illustrating a mounting portion 85b for providing a difference in pressing force to leaf springs 70d having the same structure. FIG. 7C is a view for illustrating a mounting portion 85c for providing a difference in pressing force to leaf springs 70e having the same structure. The leaf spring (pressing unit) 70c illustrated in FIG. 7A has a protrusion 70p serving as a locking portion. The mounting portion 85a of the housing 85 has a recess 85h serving as a locking portion. The protrusion 70p is fitted to the recess 85h. The perpendicular loads Fh1 and Fh2 in the parallel direction can be changed by changing a distance H1 in the parallel direction between a contact portion of an upper surface 70p1 of the protrusion 70p with respect to an upper surface 85h1 of the recess 85h and an upper surface (contact portion) 62u of the reflecting mirror 62 held in contact with the leaf spring 70c. Further, the perpendicular loads Fv1 and Fv2 in the perpendicular direction can be changed by changing a distance L1 between a contact portion of a lower inclined surface 70p2 of the protrusion 70p with respect to a lower edge portion 85h2 of the recess 85h and a contact portion of the reflection surface 62r of the reflecting mirror 62 held in contact with the leaf spring 70c. With this configuration, the difference ΔF between the pressing forces F1 and F2 which act on the both end portions E1 and E2 of the reflecting mirror 62 can be set.

The leaf spring (pressing unit) 70d illustrated in FIG. 7B has a hole portion 70h serving as a locking portion. The mounting portion 85b of the housing 85 has a protrusion 85p serving as a locking portion. The hole portion 70h is fitted over the protrusion 85p. The perpendicular loads Fh1 and Fh2 in the parallel direction can be changed by changing a distance H2 in the parallel direction between a contact portion of a lower edge 70h1 of the hole portion 70h with respect to a lower surface 85p1 of the protrusion 85p and the upper surface (contact portion) 62u of the reflecting member 62 held in contact with the leaf spring 70d. Further, the perpendicular loads Fv1 and Fv2 in the perpendicular direction can be changed by changing a distance L2 in the perpendicular direction between a contact portion of an upper edge 70h2 of the hole portion 70h with respect to an upper inclined surface 85p2 of the protrusion 85p and a contact portion of the reflection surface 62r of the reflecting mirror 62 held in contact with the leaf spring 70d. With this configuration, the difference ΔF between the pressing forces F1 and F2 which act on the both end portions E1 and E2 of the reflecting mirror 62 can be set.

The mounting portion 85c of the housing 85 illustrated in FIG. 7C has protrusions 85c1 and 85c2 serving as locking portions. The leaf spring (pressing unit) 70e has locking portions 70e1 and 70e2. The perpendicular loads Fh1 and Fh2 in the parallel direction can be changed by changing a distance H3 in the parallel direction between a contact portion of the locking portion 70e1 with respect to the protrusion 85c1 and the upper surface (contact portion) 62u of the reflecting mirror 62 held in contact with the leaf spring 70e. Further, the perpendicular loads Fv1 and Fv2 in the perpendicular direction can be changed by changing a distance L3 in the perpendicular direction between a contact portion of the locking portion 70e2 with respect to the protrusion 85c2 and a contact portion of the reflection surface 62r of the reflecting member 62 held in contact with the leaf spring 70e. With this configuration, the difference ΔF between the pressing forces F1 and F2 which act on the both end portions E1 and E2 of the reflecting mirror 62 can be set.

According to the embodiment, the difference ΔF can be given to the pressing forces F1 and F2 which act on the both end portions E1 and E2 of the reflecting mirror 62 by changing the mounting portions 85a, 85b, or 85c even when the same leaf springs 70c, 70d, or 70e are used. Thus, according to the embodiment, the variation in changes in positions of the reflecting mirror 62 due to thermal deformation of the housing 85 of the light scanning apparatus 40 can be reduced. The mounting portions 85a, 85b, and 85c for the leaf spring 70 are not limited to the above-mentioned embodiment, and the leaf spring 70 may be mounted to the housing 85 by fastening members such as screws or adhesive.

According to the embodiment, the variation in changes in positions of the reflecting mirror due to the thermal deformation of the housing of the light scanning apparatus can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-198242, filed Oct. 6, 2016, which is hereby incorporated by reference herein in its entirety.

What is claimed is:

1. A light scanning apparatus, comprising:
   a light source configured to emit a light beam;
   a deflection unit configured to deflect the light beam emitted from the light source so that the light beam scans on a surface of a photosensitive member;
   a reflecting mirror configured to reflect the light beam deflected by the deflection unit to lead the light beam to the photosensitive member;
   a housing to which the light source is attached, the housing being configured to hold the deflection unit and the reflecting mirror in the housing;
   a first support portion which is provided in the housing and is configured to support one end side of the reflecting mirror in a longitudinal direction of the reflecting mirror;
   a second support portion which is provided in the housing and is configured to support the other end side of the reflecting mirror in the longitudinal direction;
   a first leaf spring configured to press the reflecting mirror at the one end side of the reflecting mirror so as to apply an urging force for urging the reflecting mirror against the first support portion; and
   a second leaf spring configured to press the reflecting mirror at the other end side of the reflecting mirror so as to apply an urging force for urging the reflecting mirror against the second support portion,
   wherein a pressing force of the first leaf spring for pressing the reflecting mirror is larger than a pressing force of the second leaf spring for pressing the reflecting mirror.

2. A light scanning apparatus according to claim 1, wherein each of the first support portion and the second support portion includes a perpendicular support portion configured to support the reflecting mirror in a direction perpendicular to a reflection surface of the reflecting mirror and a parallel support portion configured to support the reflecting mirror in a direction parallel to the reflection surface, and
   wherein a perpendicular pressing force for pressing the reflecting mirror against the perpendicular support portion by each of the first leaf spring and the second leaf spring is larger than a parallel pressing force for pressing the reflecting mirror against the parallel support portion by each of the first leaf spring and the second leaf spring.

3. A light scanning apparatus according to claim 2, wherein the perpendicular support portion of the first support portion includes one protrusion configured to support the one end side of the reflecting mirror, and
   wherein the perpendicular support portion of the second support portion includes two protrusions configured to support the other end side of the reflecting mirror.

4. A light scanning apparatus according to claim 2, wherein the parallel support portion of the first support portion includes one protrusion configured to support the one end side of the reflecting mirror, and
   wherein the parallel support portion of the second support portion includes one protrusion configured to support the other end side of the reflecting mirror.

5. A light scanning apparatus according to claim 1, wherein the first leaf spring is different from the second leaf spring in material, plate thickness, and/or shape so that the pressing force of the first leaf spring becomes larger than the pressing force of the second leaf spring.

6. A light scanning apparatus according to claim 1, further comprising:
   a first mounting portion which is provided in the housing and has a first locking portion to which the first leaf spring is locked; and
   a second mounting portion which is provided in the housing and has a second locking portion to which the second leaf spring is locked,
   wherein the first leaf spring and the second leaf spring have the same structure, and
   wherein a first distance between an upper surface of the reflecting mirror which the first leaf spring contacts and the first locking portion is different from a second distance between an upper surface of the reflecting mirror which the second leaf spring contacts and the second locking portion so that the pressing force of the first spring is set larger than the pressing force of the second leaf spring.

7. A light scanning apparatus according to claim 1, further comprising:

a first mounting portion which is provided in the housing and has a first locking portion to which the first leaf spring is locked; and a second mounting portion which is provided in the housing and has a second locking portion to which the second leaf spring is locked, wherein the first leaf spring and the second leaf spring have the same structure, and wherein a first distance between a reflection surface of the reflecting mirror which the first leaf spring contacts and the first locking portion is different from a second distance between a reflection surface of the reflecting mirror which the second leaf spring contacts and the second locking portion so that the pressing force of the first leaf spring is set larger than the pressing force of the second leaf spring.

8. A light scanning apparatus according to claim 1, wherein the reflecting mirror comprises a plurality of reflecting mirrors, and wherein each of the plurality of reflecting mirrors are pressed by the first leaf spring and the second leaf spring.

* * * * *